June 9, 1931.  W. J. PASINSKI  1,808,934
CALCULATING MACHINE
Filed Aug. 17, 1927   3 Sheets-Sheet 1
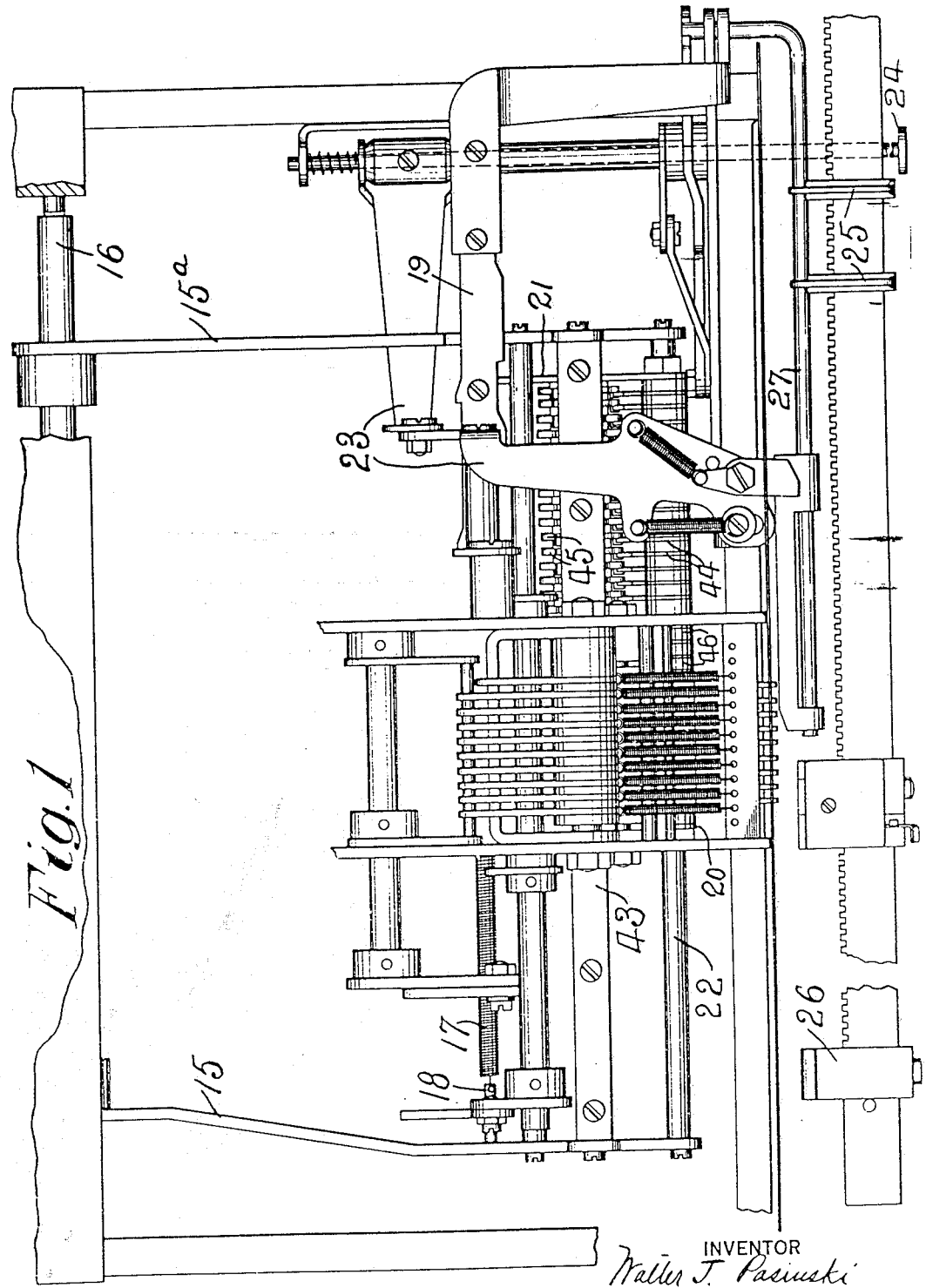
INVENTOR
Walter J. Pasinski
BY
Rector, Hibben, Davis, & Macauley
ATTORNEYS June 9, 1931.    W. J. PASINSKI    1,808,934
CALCULATING MACHINE
Filed Aug. 17, 1927    3 Sheets-Sheet 2
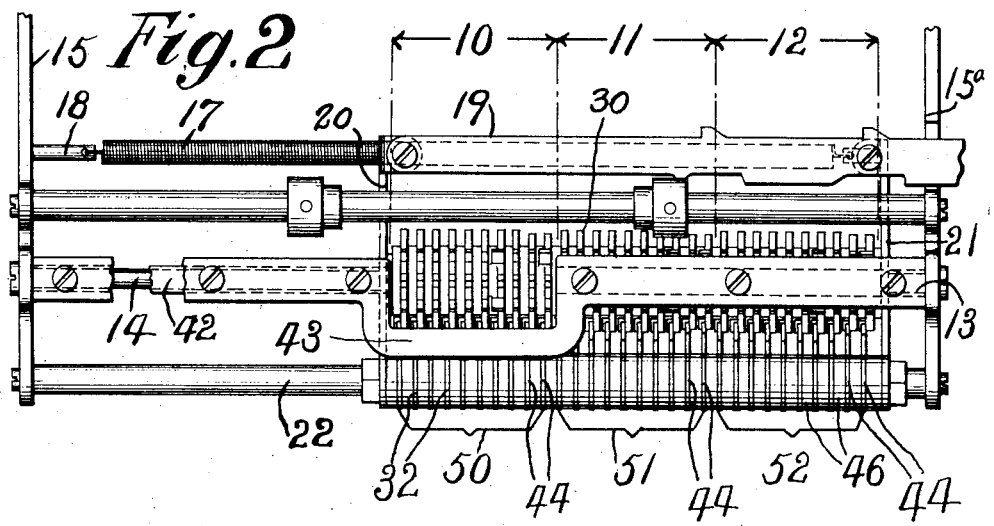
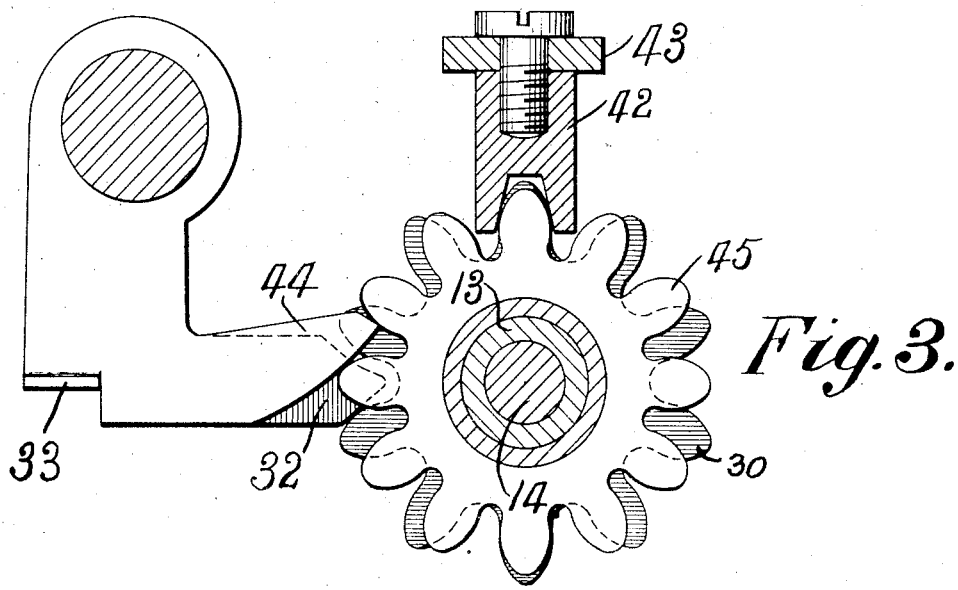

June 9, 1931. W. J. PASINSKI 1,808,934
CALCULATING MACHINE
Filed Aug. 17, 1927 3 Sheets-Sheet 3

Walter J. Pasinski INVENTOR
BY
Rector, Hibben, Davis, & Macauley
ATTORNEYS

Patented June 9, 1931

1,808,934

UNITED STATES PATENT OFFICE

WALTER J. PASINSKI, OF DETROIT, MICHIGAN, ASSIGNOR TO BURROUGHS ADDING MACHINE COMPANY, OF DETROIT, MICHIGAN, A CORPORATION OF MICHIGAN

CALCULATING MACHINE

Application filed August 17, 1927. Serial No. 213,459.

The invention relates to a calculating machine and it concerns an improvement whereby a multiple counter machine having a plurality of longitudinally movable counters may be utilized for calculations in currency systems in which the relation of the units vary, as for example, in the English sterling system where some of the calculations may be carried on by a decimal system but where others must be made in twelfths or some other multiples than ten.

The invention is particularly applicable to and is shown in connection with the well-known Burroughs Moon-Hopkins machine shown in the patent to Hopkins, No. 1,336,904, April 13, 1920, although it is to be understood that its use is not confined to this particular machine. This machine is often equipped with three front counters each comprising a separate group of counter pinions and all mounted on a single shaft on which they may be moved longitudinally to position any one of the three counters in active relation to the actuator racks. A single transfer mechanism is employed and whenever a counter is moved into active position relative to the actuator racks it is also moved into active position relative to the transfer mechanism. This transfer mechanism includes a series of trip pawls which are moved by the transfer projections on their respective pinions whenever a carry is to be effected and, in order that they may be in position to be so moved, the ends of the trip pawls project within the periphery of their respective pinions. Accordingly, if it is desired to move the counters longitudinally, the ends of the pawls must be positioned so as to be opposite spaces between teeth. They are so located in the ordinary machine built for decimal calculations but when a machine is to be used for calculations that are not made according to the decimal system, such as the English sterling system, the number of teeth on some of the counter wheels must be changed. For example, some of the pinions will have ten and others will have twelve teeth. Under such circumstances, the alignment of all the teeth becomes impossible and, for that reason, it is not possible to have the counters move longitudinally relative to the trip pawls, that must pass between the teeth. The present invention is directed to a solution of this problem.

Its object is to provide an improved multiple counter machine in which counters having pinions with different numbers of teeth may be moved longitudinally relative to the transfer mechanism so that any one of the counters may be positioned in active relation to said transfer mechanism or removed from active relation without interference of any of the parts.

Other objects and advantages of the invention will appear from the specification and drawings.

An embodiment of the invention is shown in the accompanying drawings, in which:

Figure 1 is a fragmentary plan view of a Burroughs Moon-Hopkins machine with the improvement applied thereto.

Fig. 2 is a plan view of the counter frame.

Fig. 3 is an enlarged side elevation and section showing two counter pinions having different numbers of teeth and two different forms of trip pawls so as to illustrate the relative shape and position of the parts.

Figure 4:
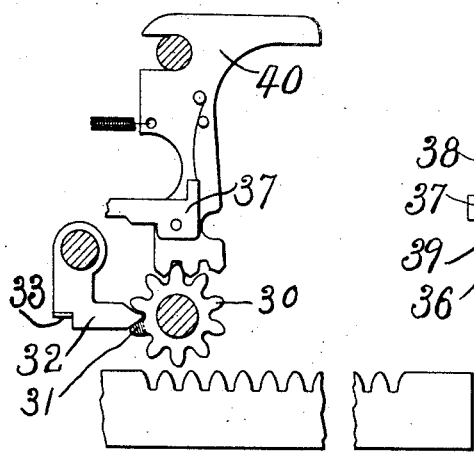
Fig. 4 is a fragmentary sectional elevation showing one of the counter pinions having ten teeth and one transfer projection, such as used in either the £ (pounds) or units of shillings bank.

Referring to Fig. 1, the counters, of which there are three,—10, 11, and 12 (Fig. 2), are rotatably mounted on a sleeve 13 which is slidably mounted on a shaft 14 carried by side arms 15 and 15a which are fastened to a shaft 16 journaled in the machine side frames so that the counter may be moved vertically into and out of engagement with the actuator racks. The counters are normally urged to the left as viewed in Fig. 1 and 2 by means of a spring 17 secured at one end to a stud 18 on the counter frame and at the other end to a slidable frame 19. This frame has two end members 20 and 21 which confine the counter pinions between them and which are slidably mounted on the shaft 14 and a shaft 22. This frame is held in its various positions by an escapement mechanism 23 (Fig. 1) which is operated by means of either a key 24 at the forward part of the machine or by counter trip dogs 25 on the typewriter carriage. When the key is operated the escapement mechanism releases the slidable frame to permit it to be moved to the left one step by the spring 17 to position the second counter in active relation to the actuator racks and transfer mechanism. The second operation of the key permits the frame to move still farther to the left to move the third counter into active position. The slidable frame is either returned by hand or by means of a stop 26 on the typewriter carriage which strikes a rod 27 carried by the slidable frame and thus moves the frame back to its normal right hand position. This mechanism is well known and for further details reference is made to the Hopkins patent heretofore mentioned.

Figure 5:
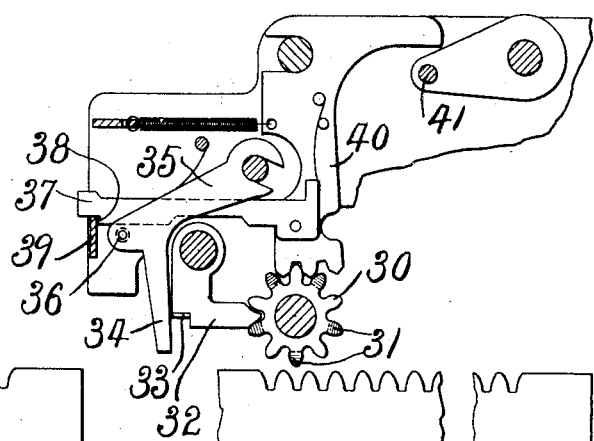
Fig. 5 is a view similar to Fig. 4 showing one of the counter pinions having ten teeth and five transfer projections such as used in the tens of shillings bank of a sterling currency machine.
Figure 6:
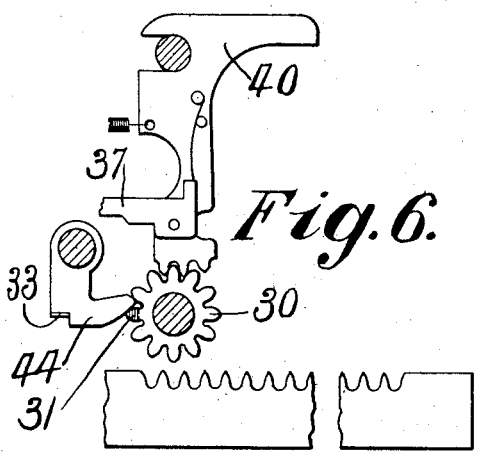
Fig. 6 is another view similar to Fig. 4 showing one of the counter pinions with twelve teeth and one transfer projection such as used for pence.
Figure 7:
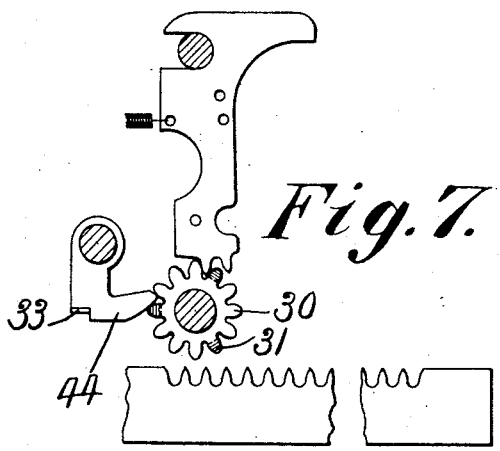
Fig. 7 is still another view similar to Fig. 4 showing a pinion having twelve teeth and three transfer projections such as used for farthings.

The transfer mechanism will be most easily understood by referring to Fig. 5. The counter pinion 30 has broad teeth or transfer projections 31 that engage a trip pawl 32. This pawl has an offset lug 33 engaging the tail 34 of a latch 35 carrying a stud 36 which raises the arm 37 so that the shoulder 38 on said arm clears the abutment 39. This releases the transfer segment 40 which moves to the left when the restoring bail 41 moves downwardly. This transfer mechanism is described in said Hopkins patent and it is not considered necessary to go into details in the present application it being sufficient to know that the transfer mechanism includes trip pawls 32 which, in the ordinary decimal system machine, pass through the spaces between the teeth of the counter pinions when the counter is moved longitudinally.

The condition that exists when counter pinions having different numbers of teeth are employed is illustrated in Fig. 3 which shows one pinion having ten teeth and another having twelve. Inasmuch as these pinions do not have the same number of teeth it is impossible to have the spaces between the teeth aligned. Ordinarily, an alignment bar is provided which aligns the teeth of the pinions of the counters that are not in active position and such bar is located at the side of the counter pinions. In the present construction an aligning bar 42 (Fig. 2) is provided which is located at the top as illustrated in Figs. 2 and 3. This bar has an offset or U shaped portion 43 so as to leave the pinions of the counter that is in active position free of the aligning bar. Although different numbers of teeth are employed in the counter pinions the teeth at one point will be in alignment even though the other teeth are out of alignment and this point in the present machine is at the top as illustrated in Fig. 3, so that the aligning bar 42 will act to align all the pinions and hold them against movement while they are out of active position. This leaves the spaces between the teeth at the side where the trip pawls 32 are located, out of alignment and the pawls must be shaped differently in order to swing about their centers into proper relation to the transfer projections. This non-alignment also makes it unfeasible to move the counters relative to the transfer mechanism.

Instead of moving the counters relative to the entire transfer mechanism a portion of the transfer mechanism is made movable with the counters and, as to this portion of the transfer mechanism, there is a portion for each counter. The part of the transfer mechanism movable with the counters comprises the trip pawls of which there are two kinds, namely; the pawls 32 for cooperation with the pinions having ten teeth and the pawls 44 for cooperation with the pinions 45 having twelve teeth. These pawls are differently shaped as illustrated in Fig. 3 and there is a pawl for each pinion, as clearly illustrated in Fig. 2. They are slidably mounted on the shaft 22 and held in position between the ends 20 and 21 of the slidable frame, there being spacing collars 46 between the pawls to properly position them relative to their counter pinions.

It will thus be clear that there is a trip pawl for each pinion of each counter and that these pawls move with the counters as the latter are moved longitudinally into and out of active position. The pawls thus move relative to the remainder of the transfer mechanism and particularly relative to the latches 35 illustrated in Fig. 5. When the counter 10 is in active position the first group of trip pawls 50 (Fig. 2) are in active position relative to the latches 35. When the counter 11 is in active postion the second group of trip pawls 51 is in active postion relative to the latches 35 and, likewise, when the counter 12 is in active postion the group of trip pawls 52 is in active position relative to the transfer latches 35. In other words, there is a portion of the transfer mechanism that is duplicated for each counter and this portion of the transfer mechanism moves relative to the remainder along with the counters as they are moved into and out of active position.

This construction permits not only the use of pinions having ten and twelve teeth as illustrated but may be also employed with pinions having other variations in number of teeth. The trip pawls can be made to suit the pitch of the particular pinions used and by making the rear ends of these pawls similar and providing pawls for each pinion to be movable longitudinally with the pinion, the counters and pawls can be moved longitudinally relative to the rest of the transfer mechanism without introducing any complications owing to the pitch or number of teeth of the counter pinions.

It is to be understood that the structure shown is for purposes of illustration and that variations may be made in it without departing from the spirit and scope of the invention as defined by the claims.

I claim:

1. The combination in a calculating machine having actuator racks and a transfer mechanism positioned opposite the same, of a plurality of counters carried by a slidable frame which is movable longitudinally to separately position the counters in active position between the racks and transfer mechanism, each of said counters comprising a series of pinions some of which have different numbers of teeth than others and an individual series of trip pawls for each counter pivoted on said frame and movable longitudinally therewith into and out of active relation to said transfer mechanism.

2. The combination in a calculating machine having actuator racks and a transfer mechanism, of a plurality of counters movable longitudinally into and out of active position relative to said racks and transfer mechanism, each of said counters comprising a series of pinions some of which have different numbers of teeth and each of which has one or more transfer projections, and an individual series of transfer trip pawls for each counter, operated by and movable with it, each of said pawls being shaped to cooperate with the transfer projection of its pinion and all of said pawls being shaped so that they may be freely moved with the counters into and out of active relation with the transfer mechanism.

3. A calculating machine having a plurality of counters each comprising a plurality of pinions some of which have different numbers of teeth than others, and a single transfer mechanism for all of said counters including trip pawls individual to each of said counter pinions and movable with said counters as they are moved into active position relative to said transfer mechanism, said pawls being constructed so that the pawls for the pinions having different numbers of teeth move into operative relation with said transfer mechanism without interference when the counters are moved into active position relative to said transfer mechanism.

In testimony whereof, I have subscribed my name.

WALTER J. PASINSKI.